United States Patent [19]
Ennis et al.

[11] 3,970,549
[45] July 20, 1976

[54] SCREEN ASSEMBLY AND DEWATERING TECHNIQUE

[75] Inventors: Robert E. Ennis, West Simsbury, Conn.; Robert G. Derrick, Buffalo, N.Y.

[73] Assignees: Linatex Corporation of America, Stafford Springs, Conn.; Derrick Manufacturing Corporation, Buffalo, N.Y.

[22] Filed: Jan. 2, 1975

[21] Appl. No.: 538,023

Related U.S. Application Data

[63] Continuation-in-part of Ser. No. 371,170, June 18, 1973, abandoned.

[52] U.S. Cl. .............................. 209/341; 209/399; 209/403; 210/19; 210/388; 210/498
[51] Int. Cl.² ............................................ C10G 5/00
[58] Field of Search ............. 210/19, 498, 232, 388, 210/389, 499; 162/228, 229, 293; 209/365, 327, 329, 333, 341, 346, 344, 397, 403, 382, 398, 399, 243

[56] References Cited
UNITED STATES PATENTS

| 2,183,896 | 12/1939 | Rupp et al. ............................. 210/19 |
| 2,236,378 | 3/1941 | Overstrom et al. ................. 209/243 |
| 2,799,398 | 7/1957 | Heymann ............................. 210/19 |
| 3,194,397 | 7/1965 | Taege ................................... 209/398 |
| 3,684,091 | 8/1972 | Wehner ............................... 209/399 |
| 3,706,376 | 12/1972 | Krause ................................. 209/382 |
| 3,833,120 | 9/1974 | Ogata ................................... 209/399 |

*Primary Examiner*—Charles N. Hart
*Assistant Examiner*—Ernest G. Therkorn
*Attorney, Agent, or Firm*—Prutzman, Hayes, Kalb & Chilton

[57] ABSTRACT

A new and improved nonadjustable self-cleaning dewatering screen panel assembly suited to vibratory dewatering of fluid slurries containing fine particulate solid material is comprised of a rigid frame member and a substantially planar screen panel mounted within the frame and secured thereto under tension in both planar directions. The screen panel is a unitary one piece elastomeric sheet consisting of a plurality of pulsator portions and integral bordering stabilizer portions. The pulsator portions of the elastomeric panel are comprised of a multitude of substantially identical diaphram elements arranged in intimate, aligned and confronting relationship so as to present a smooth top screening surface. The diaphram elements are of uniform cross section throughout their depth and define a column of spaced parallel slits between individual abutting elements to permit limited, random, harmonic and pulsating motion of the flexible elements within the plane of the assembly in addition to the vibratory motion of the assembly. The screen panels may also be used for classification by size of particles in the range of 10–50 mesh.

17 Claims, 5 Drawing Figures

SCREEN ASSEMBLY AND DEWATERING TECHNIQUE

RELATED APPLICATION

This is a continuation in part of our copending application, Ser. No. 371,170 filed June 18, 1973, now abandoned.

BACKGROUND AND SUMMARY OF THE INVENTION

The present invention relates generally to a screening media for dewatering and the like and is more particularly concerned with a new and improved screen panel or screen deck construction and dewatering technique particularly adapted for use in dewatering and sizing slurries containing solids of fine particle size, generally ⅛ inch down to about 325 mesh, but not limited thereto.

In the processing and handling of aggregate materials such as sand, gravel or crushed stone, as well as in related industries such as the coal, slag, iron ore, phosphate, potash, primary metal and related chemical industries, it is necessary to utilize relatively large quantities of water or other liquids in conjunction with or as a dispersing medium for finely sized solid particles produced in the respective grading, concentration or other process. At some point in the process, it is usually necessary to subsequently effect a separation or dewatering of these fine solid materials.

One method of dewatering fine granular material prior to disposing of the waste water or other liquid has been to subject the mixture to suitable dewatering devices. The most widely employed method for dewatering in the mineral aggregates industry is an inclined screw dehydrator which slowly moves the solid material up the incline of the screw thread out of a feed basin permitting back flow of the water to waste. However, such equipment has limited water handling capacity and is plagued by the loss of valuable fine sands which are carried away in the back flow. Also, such equipment consumes an appreciable amount of energy, typically from 20 to 40 horsepower per unit, and in some cases more.

Another technique involves the use of centrifugal force to remove the free moisture. However, the high cost, high power consumption, and wear characteristics associated with such centrifuge apparatus have prevented the wide use of that technique on a commercial basis for handling abrasive materials. Similarly, the use of pressure or vacuum filters has not been commercially attractive, particularly for the sand and gravel and crushed stone industries.

Another technique sometimes employed for dewatering fine particle slurries is the use of conventional vibrating dewatering screens. The decks of these screens have taken the form of finely woven wire cloth or a plurality of parallel steel rods or strips separated by small gaps of predetermined gauge. These rod decks are generally constructed of stainless steel wedge shaped members.

When handling slurries containing particles below a screen mesh size of about ⅛ inch or 10 mesh, both the metal wire cloth decks and metal rod decks have a severe disadvantage as they rapidly tend to plug and blind, preventing the separation of water from the fine solids. This phenomenon occurs as a result of small particles becoming wedged in the wire cloth or rod deck openings. Such plugging and blinding problems have restricted the use of vibrating screens for fine particle dewatering, and when conventional screens are used for this purpose, their capacity is very much limited because the load must be kept "thin" and uniform to prevent plugging and subsequent blinding of the deck.

Also such wire cloth and metal rod decks exhibit the undesirable characteristic of rapidly increasing the size of the aperture or opening between the wires or rods as the top surface of the deck wears away from the abrasive action of the solids being dewatered. This condition causes valuable material that should be recovered as a dewatered fines product to pass through the deck openings enlarged by wear and be lost in the waste effluent. Attempts to cap the metal rods with abrasion resistant rubber or completely replace the rods with rubber has not proven effective because of the difficulty in maintaining very fine openings that must be used for such dewatering service. Perforated all-rubber or rubber-clad steel screen decks are commonly used by the mining, sand, gravel and crushed stone industry, but these are not offered with openings under about ⅛ inch or about 10 mesh and therefore are not used for dewatering or sizing fine granular materials.

It will also be appreciated that fine mesh wire cloth and metal rod decks when used for dewatering fine granular slurries have the additional economic disadvantage of having a relatively short life because they rapidly wear as the result of abrasion and the corrosive effect of atmosphere or the chemically active material being handled. Metal fatigue and cracking is also a common problem.

In U.S. Pat. No. 3,194,397 there is disclosed a perforated rubber panel that is clamped at opposite ends and stretched in a direction transverse to the elongated slots therein to adjust the width of the slots. The panel moves vertically in trampoline fashion during vibration since it is secured to its frame at only the ends of the panel. This vertical motion causes the slots to expand and contract thereby providing a self-cleaning effect. When particles become lodged, the panel is further tensioned to allow them to fall through. Reinforcing elements are also provided parallel to the slots to limit tensioning in one direction only while dampening the trampoline action of the panel without interferring with the adjustability of the slots. Such vertical or trampoline action is believed to be impractical in commercial operations and places severe stress on the entire screen deck.

As can be appreciated, the industry is constantly seeking new and improved methods for dewatering large quantities of fine solid slurries.

Accordingly, it is a principal object of the present invention to provide a new and improved dewatering screen deck and dewatering method that obviates many of the deficiencies and difficulties encountered in prior dewatering techniques by utilizing a unique dewatering action that substantially increases both the capacity and efficiency of the dewatering operation at lower cost. Included in this object is the provision for a vibrating dewatering screen deck panel that not only oscillates at the predetermined frequency of the driving vibrator, but additionally provides a random array of independently pulsating dewatering diaphrams that rapidly and efficiently dewater or separate the liquid phase from a slurry containing solids of fine particle size.

Another object of the present invention is to provide a new and improved dewatering screen deck that is characterized by a self-cleaning action and the absence of undesirable plugging and blinding of the fine solids without the necessity for constantly adjusting the size of the openings in the deck.

Another object of the present invention is to provide a new and improved dewatering technique adapted for efficient high capacity operation in the removal of free moisture from a substantially thicker or deeper slurry feed by combining a planar pulsating action at multiple locations throughout the screen with simultaneous resonating vibration of the entire screen to very rapidly and smoothly "cake" the solid component including the "fines" and move the resultant particulate cake across the screen without substantial loss of the extremely fine particles therefrom, or plugging.

Another object of the present invention is to provide a new and improved nonadjustable dewatering screen deck operative in the manner described while at the same time obviating the deficiencies of the finely woven wire cloth and steel rod decks in that wear will not effect change in the screen openings and the deck operates in a self-cleaning manner to prevent plugging and blinding.

Another object of the present invention is to provide a method of dewatering fine granular slurries which requires significantly lower power consumption than that required for conventionally used apparatus such as screw dehydrators, centrifuges, vacuum filters and the like.

Still another object is the provision for a unique long wearing, nonadjustable, nonblinding screen deck that also can be used for sizing fine particulate material of less than about ⅛ inch.

Other objects will be in part obvious and in part pointed out in more detail hereinafter.

These and related objects are accomplished in accordance with the present invention by providing a new and improved screen deck assembly suited to vibratory dewatering of fluid slurries containing fine particulate solid material. The screen deck assembly is comprised of individual units consisting of a rigid frame member and a substantially planar screen panel fixedly mounted within the frame. Each panel is tensioned in both planar directions before being secured to the frame and consists of a plurality of pulsator portions and integral stabilizer portions bordering the pulsator portions. The tensioning in both planar directions draws the panel into a substantially rigid or taut condition and the stabilizer portions of the panel are positively and immovably secured to the rigid frame member. The screen panel within the frame is a unitary one piece member composed of an elastomeric material throughout its entire extent. The pulsator portions of the elastomeric panel are comprised of a multitude of substantially identical diaphram pulsator elements arranged in intimate, aligned and confronting relationship so as to present a smooth top screening surface. The pulsator elements extend through full depth of the panel and define a column of spaced parallel slits between individual abutting elements to permit limited random pulsating motion of the flexible elements within the plane of the panel in addition to the vibratory motion of the entire screen assembly.

An additional benefit of the present invention is the provision for a unique and exceptionally efficient dewatering process which utilizes the aforementioned dewatering screen deck assembly fitted to a vibrating screen mechanism operating at a fixed frequency and fixed amplitude sufficient to effect the desired additional random frequency pulsating motion of the pulsator elements independently of the induced, fixed vibratory motion of the vibrator mechanism. A fluid slurry of fine particulate solid material fed to the vibrating screen deck passes across the deck in a direction substantially normal to the elongated slits between the elements so that the pulsating motion of the elements within the plane of the deck effectively draws the fluid from the slurry while simultaneously allowing the solid particulate material therein to form a coherent mass for vibratory conveyance along the smooth and bi-axially taut top surface of the screen assembly without substantial loss of the fine particulate material.

Still another benefit of the present invention is the provision for a process whereby very accurate classification by size of fine particles may be accomplished. Such process involves feeding to the deck of the invention a dilute water and solids slurry over the major length of the deck. In such mode of operation the water rapidly passes through the openings in the panel carrying with it particles of a size finer than the openings in the panel.

A better understanding of the objects, advantages, features, properties and relationships of the invention will be obtained from the following detailed description and accompanying drawing which set forth an illustrative embodiment and are indicative of the way in which the principles of the invention are employed.

DESCRIPTION OF A PREFERRED EMBODIMENT

Figure 1:
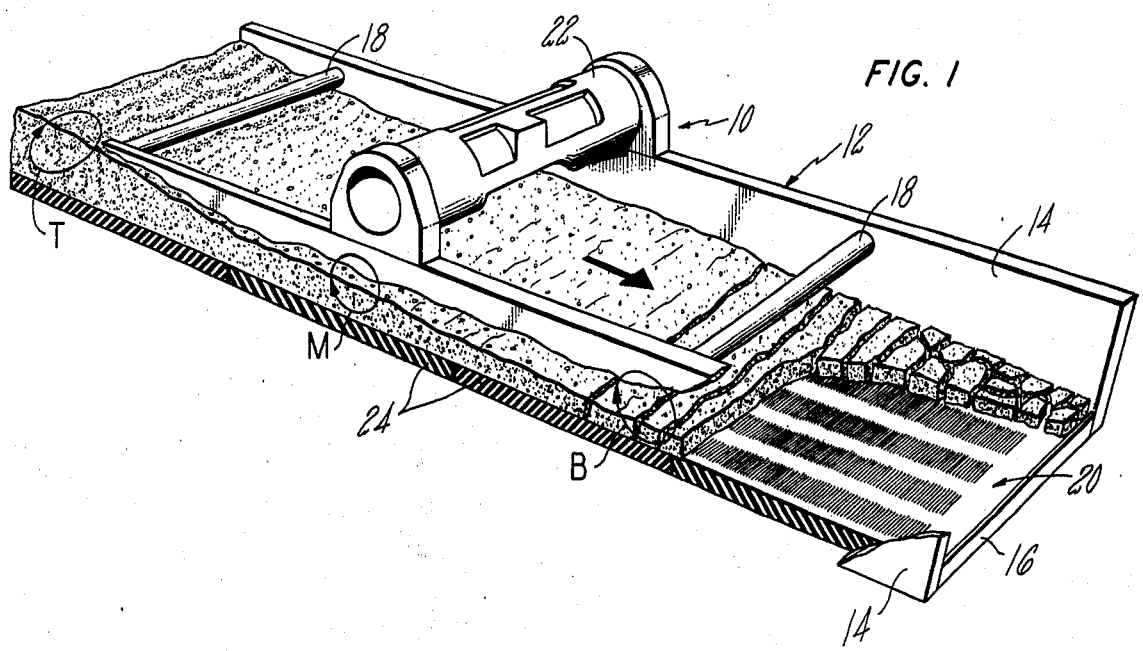
FIG. 1 is a perspective view partially broken away and partially in section of a vibratory screening machine embodying the features of the present invention and illustrating the manner in which a fluid slurry is dewatered and the cake of particulate solids is conveyed therealong in accordance with the present invention.

Referring now to the drawings in greater detail wherein like reference numerals indicate like parts throughout the several figures, FIG. 1 illustrates one form of a screening machine 10 utilizing the features of the present invention. The machine 10 takes the form of a generally U-shaped spillway inclined so as to receive the fluid slurry at the raised or elevated end thereof. The machine consists of a U-shaped frame 12 having solid upstanding side walls 14 secured in spaced parallel relationship by a plurality of base beam supports 16 and a plurality of transverse bracing members 18. An elongated generally rectangular screen deck 20 is mounted on the beam supports 16 of the frame 12 and forms the base of the U-shaped spillway while a vibrating motor assembly 22 is supported by the side walls 14 and extends therebetween about midway between the ends of the spillway. Preferably, a plurality of individual screen assemblies 24 are utilized in forming the screen deck 20 of the screening machine and can be arranged so as to provide a continuous smooth screening surface or, alternatively, can be arranged so as to cause a cascading effect as the slurry of solid material passes from one screen assembly to the next.

The vibratory motor assembly 22 illustrated in FIG. 1 and found particularly advantageous in the present invention is a motor constructed to impart high frequency low amplitude motion to the screen deck 20. Although other vibrating mechanisms both mechanical and electrical, may be employed, it is generally preferred to use a mechanism that will impart to the screen deck a high frequency rocking motion and in this connection the high speed, low amplitude induction motors sold by Derrick Manufacturing Corporation have proven particularly beneficial. These motors are high speed units typically operating at a frequency of from about 1800 rpm up to about 3600 rpm, even under high load conditions.

A particularly advantageous feature of the Derrick motor is the cyclic movement that it imparts to the entire screen deck 20 and the particulate slurry carried thereon. As illustrated in FIG. 1, the slurry is fed to the elevated or uppermost end of the inclined screen deck 20 and the cyclic motion of the unit throws the initially deposited material in a forward direction as it moves along the oblique cyclic path depicted by the arrow T, thereby quickly spreading the slurry over the surface of the screen deck. The high speed vibratory action energizes the load to cause an expansion or bouncing of the slurry thereby permitting rapid downward percolation of a major portion of the free liquid toward the screen deck and the subsequent passage therethrough. As the particles move toward the midpoint of their forward motion along the deck the vigorous oblique vibration slowly changing to a substantially circular motion (see arrow M) and this action is imparted to the load which is then in the form of a particulate cake or mass. As this cake moves towards the discharge end of the screen deck the vibratory motion is such as to throw the material backward as indicated by arrow B in a manner which slightly retards the forward movement of the load while continuously applying the vibrating force thereto to assure further and complete separation of all the free water by the dewatering screen.

Figure 2:
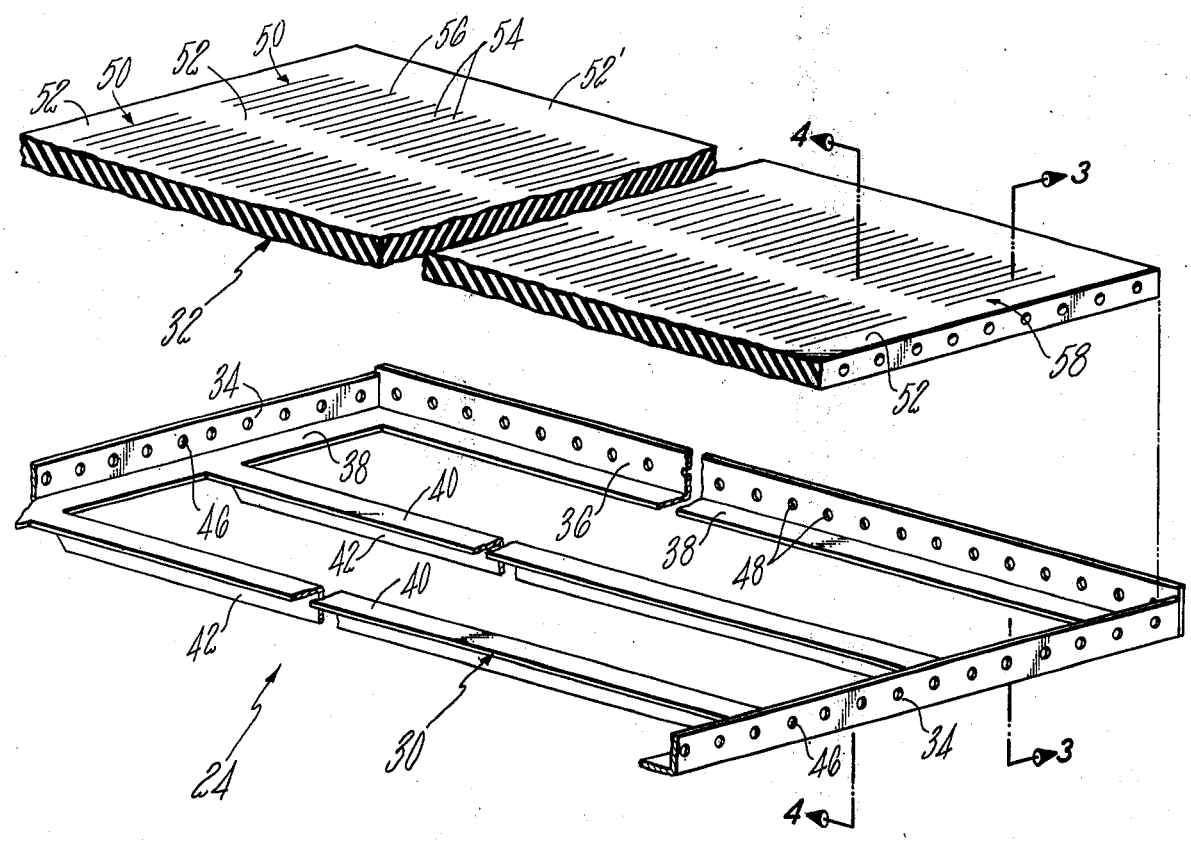
FIG. 2 is an enlarged exploded perspective view of a portion of a dewatering screen assembly utilized in the vibratory screen deck of FIG. 1.

As mentioned hereinbefore, the screen deck 20 is illustrated as being comprised of a plurality of individual screen assemblies 24 that are preferably arranged so as to provide a continuous smooth screening surface. These generally rectangular screen assembly 24 of the present invention are best shown in FIG. 2 as being comprised of a sturdy metal frame member 30 within which is secured a substantially planar screen panel 32 of rubber-like elastomeric material. The frame member 30 is comprised of parallel front and rear walls 34 integrally joined to a pair of parallel side walls 36 shown as being of slightly greater height than walls 34. An inwardly projecting flange 38 extends integrally from walls 34, 36 of the frame 30 and provides a base or support for the edges of the panel 32. A plurality of spaced supporting strips 40 disposed within the same plane as the flange 38 extend integrally therefrom between the front and rear walls 34 in aligned spaced parallel relationship. The strips 40 are provided with reinforcing bars 42 depending downwardly therefrom along their extent to impart to these intermediate supports a generally inverted L-shaped cross sectional configuration. The upstanding front and rear walls 34 of the frame are provided with numerous closely spaced apertures 46 while the side walls 36 of the frame are provided with similar closely spaced apertures 48 to facilitate appropriate tensioning in both planar directions and securing of the screen panel 32 to the frame member 30.

Figure 3:
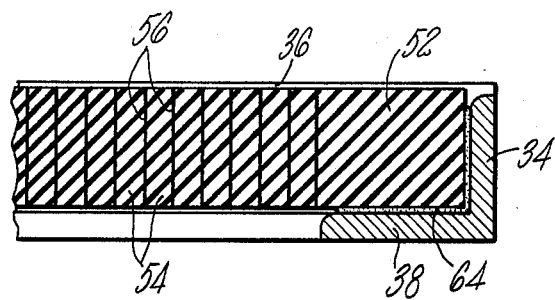
FIG. 3 is an enlarged sectional view taken along the line 3—3 of FIG. 2 illustrating the intimate confronting relationship of the individual screening elements within the screen panel.
Figure 4:
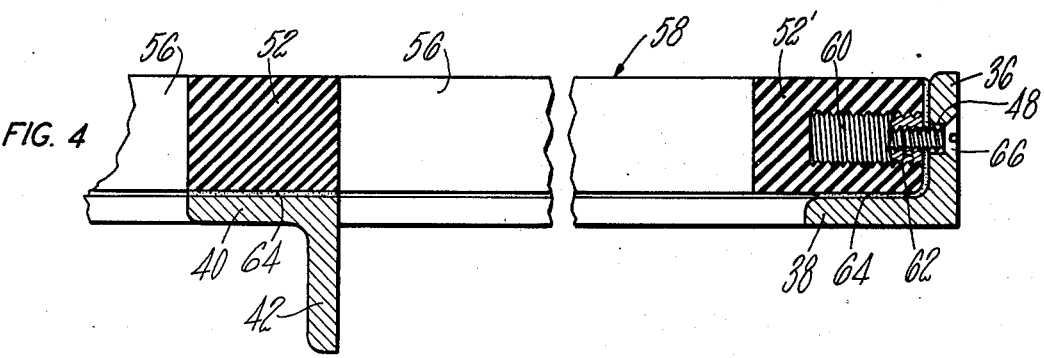
FIG. 4 is an enlarged sectional view taken along the line 4—4 of FIG. 2.

The planar screen panel 32 of the screen asseembly 24 is a relatively thick sheet material of unitary one piece construction composed entirely of wear resistant, elastomeric or rubber-like material. The screen panel 32 is best visualized as a solid rubber sheet of about ¾ inch thickness that has been selectively slit to provide a plurality of generally rectangular pulsator screening portions 50 that are aligned in substantially parallel side-by-side relationship with their longitudinal dimension preferably extending from the front to the back of the assembly. Solid stabilizer portions 52 and 52' border and separate the rectangular pulsator portions 50 and are integrally joined thereto along their longitudinal dimension. As best seen in FIGS. 3 and 4, the solid stabilizer portions 52 are in substantially overlying registry with both the inwardly projecting flange 38 adjacent walls 34 and the supporting strips 40 of the frame 30. In the embodiment illustrated the stabilizer portion 52' adjacent side walls 36 are shown as being slightly wider than portions 52 to provide for the particular fastening means used to secure the panel 32 to the frame 30.

The rectangular pulsator portions 50 of the screen panel are comprised of a multitude of substantially identical diaphram screening elements 54 arranged in intimate aligned, confronting relationship. The individual elements 54 extend through the full depth of the panel and are of substantially uniform width throughout their entire depth and length. These elements are best visualized as thin strips that have been formed in a solid sheet-like panel by a plurality of parallel slits of limited length without removing any material from the elastomeric sheet. As mentioned, the individual pulsator elements 54 are intimately secured to the remaining solid, unslit portions of the screen panel and are integral with the stabilizer portions 52, 52', at both ends of the elements throughout the full depth of the panel. This construction is easily accomplished by appropriately slicing a solid rubber sheet using steel rule knives or the like. In fact, the slits 56 defined by elements 54 are usually of such fine gauge that they are not readily visible on the top screening surface 58 of the sheet material when it is in its untensioned rest condition.

As can be appreciated, the dimensions of the relatively large pulsator portions 50 may vary substantially depending upon the particular end use of the screen panel. However, good results have been obtained using pulsator portions having a transverse dimension of about 3–8 inches and typically about 4–6 inches. Thus, the slits 56 that terminate at the stabilizer portions and extend normal thereto are also typically about 4–6 inches long. As can be appreciated, the major dimension of the pulsator portions 50 will vary with the size of the screen panel 32 and can be as short as about 1 foot or as long as about 6 feet or more. Typically, the rubber-like screen panel will fall within the range of approximately 18–60 inches from front to back with most pulsator portions 50 having a major dimension of about 2 to 4 feet.

The actual size of the diaphram elements 54 in each pulsator portion 50 may vary substantially depending upon the particular application; however they generally have a length to width ratio that is typically about 10 to 1 to 60 to 1 and preferably about 15–50:1. As can be appreciated, the length and width of the individual diaphram elements also will depend upon the thickness of the panel. Thus, typical panels of about ½ to 1½ inches in thickness will have diaphram elements 54 of approximately 4–6 inches in length and ⅛ to ¼ inch in width. The stabilizer portions 52 are typically equal in width or slightly wider than the supporting flange 38 and supporting strips 40 and are generally about 1 inch wide except adjacent the side walls 36 where stabilizers 52' have a width of about 1-½ inches.

Figure 5:
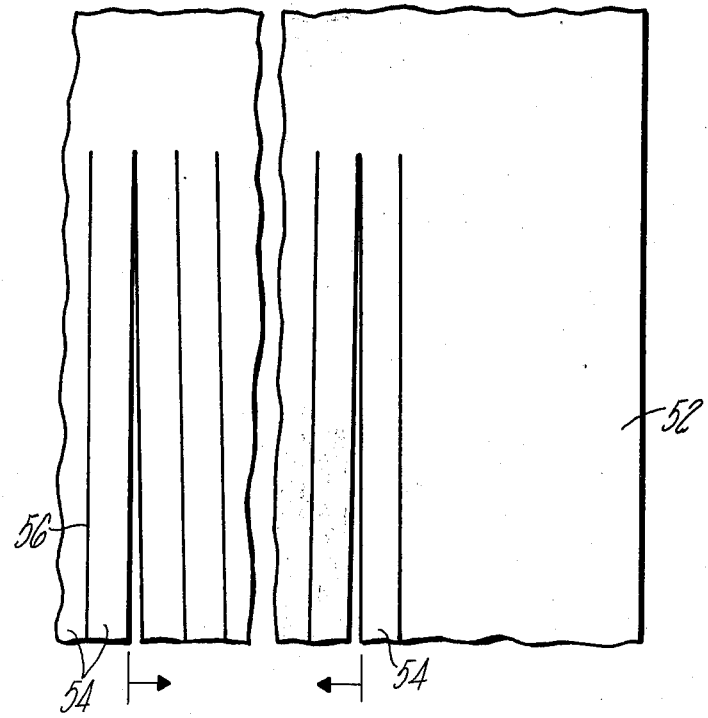
FIG. 5 is a top view of portions of the dewatering screen panel illustratively depicting the independent and random motion of the elements in the panel during the screening operation.

The planar screen panel 32 is mounted within the rigid steel frame member 30 and firmly secured and tensioned thereto in both planar directions to prevent unnecessary fluttering of the panel and maintain the desired dimensional stability of the openings during the vibratory screening action. Thus, the screen panel is drawn taut within the frame and securely affixed thereto. This may be accomplished in the manner best illustrated in FIG. 4 by anchoring a plurality of connecting members 60 within side apertures 62 in the side stabilizing portions 52' of the screen at spaced locations therealong. Similar anchoring members 60 also are placed within apertures in the peripheral stabilizer portions 52 confronting the front and rear walls 34 of the frame in such a manner as to be aligned with the solid stabilizer portions 52 separating adjacent pulsator portions 50. The panel 32 in its untensioned condition exhibits planar dimensions that are less than the dimensions defined by the walls 34, 36 of the frame. Additionally, since the panel is to be tensioned in both planar dimensions, the side apertures 62 in the panel initially are not in alignment with the apertures 46, 48 of the frame. However, it is necessary that the apertures 62 be precisely located to effect proper registration with apertures 46, 48 when the panel has been stretched in both directions to bring it into full peripheral contact with the frame and provide the desired taut anchored condition of the panel within the frame. Additionally, if desired, a suitable adhesive 64 may be placed between the supporting portions of the frame 30 and the solid stabilizer portions 52, 52' so as to assist in securing the panel 32 to the frame member at substantially all areas of contact therebetween. Threaded fasteners, such as machine screws 66 shown in FIG. 4, may then be used to cooperate with connecting members 60 to draw the screen panel in both planar directions toward the walls 34, 36 of the frame and into its desired taut or tensioned condition. The tensioning of the panel in both planar directions is important to its efficient operation. This tensioning of the screen panel 32 within the frame 30 provides the desirable limited and controlled separation between the diaphram elements 54. However, that separation is sufficient so that when the entire panel is vibrated the diaphram elements are free to vibrate independently and in a random fashion within the plane of the panel and relative to the vibration of the entire screen assembly. For example, for a screen panel of about two feet by four feet the elongation necessary to bring the panel to a taut condition is about 3 inches in the machine or flow direction from front to back and about 2½ inches in the transverse or cross direction. Accordingly, as can be appreciated, the spacing between abutting pulsator elements is not appreciable. However, as illustratively depicted in FIG. 5, it is sufficient so that the elements 54 within a single pulsator portion 50 may move in opposite directions at random spaced locations therealong during the vibratory movement of the screen deck 20.

As mentioned, the screening panel 32 is a sheet-like member formed of a rubber or rubber-like elastomeric material having excellent wear characteristics. The abrasion resistant elastomeric material may be a natural or synthetic composition exhibiting a durometer hardness value of about 30 to 70. For example, natural elastomers such as natural rubber, e.g. cispolyisoprene or trans-polyisoprene as well as synthetic elastomers such as polychloroprene (neoprene), P.V.C. and P.V.C. copolymers, ethylene propylene terpolymers, poly olifins including chlorosulfonated polyethylene, butadiene-styrene or butadiene-acrylonitrile copolymers, isobutyl or polyurethane rubbers may be used. However, one of the commonly preferred elastomers is a specially processed natural rubber vulcanizate commercially available under the registered trademark "Linatex." As mentioned, other elastomeric material exhibiting similar wear resistant characteristics can be utilized.

The new and improved screen deck construction and dewatering technique of the present invention provides not only for oscillation of the screen at a predetermined frequency, but additionally combines a random frequency pulsating action at multiple locations throughout the screen to rapidly and smoothly dewater and "cake" the solids in the particulate slurry, including the very fine material, and move the resultant particulate cake across the screen without substantial loss of such extremely fine particles therein.

In operation, the screen deck panel assembly 24 described hereinbefore is preferably mounted within the deck 20 so that the diaphram elements 54 are aligned in a direction normal to the direction of travel of the slurry across the screen surfaces 58. As the slurry moves across the surface, the diaphram elements 54 tend to move violently in and out along a direction that is generally parallel to the direction of travel of the slurry (see FIG. 5). This allows the slurry to rapidly dewater and form a cake which moves across the surface without particles abrading therefrom and with no blinding or plugging of the screening surface. Additionally, the screen deck provides high efficiency removel of free water from the slurry without substantial loss of very fine material.

Although the screen deck comprised of panels of the present invention and the manner of its operation should not be limited to any particular theory, it is believed that the forces primarily responsible for the highly efficient operation thereof include not only gravity but also a high velocity vertical anti-gravity component applied to the initial slurry by the vibrator mechanism as it comes in contact with the screen. This force causes the slurry mass to expand and permits the free water to percolate down through the bed of solid material to the screening surface where suction and positive displacement forces caused by the harmonic and random horizontal movement of the diaphram elements 54 rapidly remove the liquid. For example, as the mixture of solids and water in the slurry is fed to the vibrating screen deck 20 it is immediately activated by the high frequency, low amplitude vibration of the screen mechanism and frame. This imparts a vertical, upward, disruptive force component to the slurry causing the loose conglomeration of fines, solids and water to bounce and expand across the screen surface. The resultant activation of the slurry creates sufficient openings within the mass for free water to percolate by gravity downwardly toward the surface of the deck. Simultaneously, the diaphram elements 54, which are vibrating or moving with the assembly at the designated frequency typically, between 1800 and 3600 cycles or revolutions per minute, tend to also move within the plane of the panel relatively independently of the movement of the entire assembly. The latter movement of elements 54 is a random and harmonic motion within the plane of the panel 32 toward and away from each other. This horizontal component of motion by the diaphram elements is of course facilitated by the elastomeric nature of the material used in the screen panel and causes rapidly opening and closing of the slits 56 between the elements to rapidly create voids or isolated vacuum "spots" each time such an opening occurs. The vacuum condition or force acts as a suction force drawing into the opening that water which has percolated downwardly and tended to concentrate adjacent the screening surface 58.

As will be appreciated, the diaphram elements 54 not only open rapidly to cause the random vacuum condition across the screening surface 58, but also tend to close rapidly as the elements move toward one another. Consequently, the fluid and/or air drawn into the space between the elements 54 is displaced and expelled from the opening either upwardly or downwardly, whichever way affords the least resistance. Since the slurry or bed of material on the top screening surface of the assembly has a thickness of about two inches or more, the fluid and entrapped air is preferentially expelled downwardly through the screen deck. It is an important feature of this horizontal or planar opening and closing action of the elements that the major portion of the free water is rapidly removed from the slurry and in fact it is pulled therefrom in less than one quarter of the travel of the material along the length of the screen deck 20. This in turn affects the rapid formation of a wet or damp cake that entraps the very fine solids in its intersticies and prevents these fines from being washed through the screen opening with the water. Additionally, the rapid opening and closing of the elements does not permit particles to become wedged therein and thus cause plugging and blinding of the screen deck. In fact, any fine particle which happens to work itself into a slot opening is promptly washed through when the horizontal movement of the elements causes it to reopen.

The absence of plugging and blinding is of substantial significance in a dewatering screen operation and heretofore has been a very common and costly operational problem with all known types of screening media when handling fine solids. In fact, the problem has been of such extent as to restrict the use of vibrating screens for fine particle dewatering. The operation of the new and improved screen deck assembly of this invention not only overcomes that problem, but is additionally unique in its ability to process substantially higher feed rates. In fact, the present invention has increased the capacity of a typical fine solids slurry dewatering screen operation by as much as ten fold from about 10–15 tons per hour to about 125 tons per hour with equivalent efficiency.

Remarkably low energy consumption is another advantage of the present invention. A typical example is drawn from a field proven commercial comparison of the present invention with established conventional means. When dewatering an iron ore slurry containing 50 tons per hour of solids with the objective of producing a dewatered product containing approximately 18 percent cake moisture, a drum type vacuum filter will require about 115 horsepower. For the same dewatering duty, a vibrating screen machine equipped with a deck comprised of panels of the present invention requires less than 5 horsepower, representing a 95 percent reduction in energy consumption.

As mentioned, the rapid formation of the partially dewatering cake traps the very fine solid particles that would otherwise be washed through the deck openings if the solids remained in a more fluid condition for a longer period. In this connection, it has been found that the screen assembly of the present invention may also be used for classification or sizing operations in the range of from 10 mesh down to about 50 mesh by only slightly modifying the operating technique described hereinbefore. This has been accomplished by feeding the deck an exceptionally dilute slurry so as to purposely prevent the rapid cake formation mentioned hereinbefore and maintain the dilute slurry for a major portion of travel along the deck. The relatively large volume of water in the slurry will create a very open disbursement of all particles within the slurry and the water will promptly flow through the openings in the deck carrying with it the particles of a size finer than the deck openings thus accomplishing a separation of the material by size. Such a sizing operation is particularly advantageous from an economics standpoint in view of the fact that fine wire cloth or steel rod type decks have been necessary heretofore to provide the desired separation and the elastomeric screen deck of this invention will typically last from 100 to 200 times longer than such wire cloth or rod decking. Additionally, the size of the opening in such fine wire cloth or rod deck is rapidly enlarged by the abrasive screening operation, whereas in accordance with the present invention, the wear along the top surface of the screening assembly does not substantially change the size of the openings in the screen, the size of the openings being fixed during assembly and being nonadjustable thereafter. Further, and very important, the operation in accordance with the present invention prevents the plugging and blinding problems mentioned hereinbefore.

As will be apparent to persons skilled in the art, various modifications, adaptations and variations of the foregoing specific disclosure can be made without departing from the teachings of the present invention.

We claim:

1. A nonadjustable self-cleaning dewatering screen panel assembly for vibratory dewatering of fine granular material passing across the assembly in a first direction, said assembly being comprised of a rigid frame member and a substantially planar screen panel mounted on and rigidly secured to the frame for nonadjustable retention within the plane of the frame during vibration of the assembly, said panel being a unitary one piece member composed of elastomeric material throughout its depth and consisting essentially of a plurality of pulsator columns and integral stabilizer portions bordering the pulsator columns, said pulsator columns and stabilizer portions extending substantially parallel to said first direction, said stabilizer portions being secured to the frame to prevent relative movement therebetween, said pulsator columns being comprised of a multitude of substantially identical diaphragm elements arranged in intimate aligned confronting relationship so as to present a smooth top screening and dewatering surface, said elements extending through the full depth of the panel and defining a column of spaced parallel slits between individual abutting elements to permit limited and random pulsating motion of the diaphram elements within the plane of the screen assembly in response to vibratory motion of the assembly, said elements extending transversely to said first direction, said panel being uniformly tensioned within its plane in both said first direction and transversely of said first direction to effect a taut condition and uniformity of slit opening within the panel while maintaining the rigidity required to support the load passing thereacross, said panel being mounted within said rigid frame in its taut bidirectionally tensioned condition and being fixedly and positively secured to the frame about its entire periphery in its taut condition to prevent movement of the panel out of the plane of the frame during vibratory motion of the assembly.

2. The dewatering screen panel assembly of claim 1 wherein the smooth top screening surface of the pulsator portion is comprised of substantially rectangular individual diaphragm element surfaces, the parallel slits defined by the elements extending along the major dimension of the elements within a plane substantially perpendicular to the plane of the screen panel.

3. The dewatering screen panel of claim 1 wherein the diaphram elements are of substantially uniform width throughout their depth whereby the confronting relationship of abutting elements is substantially unaffected by wear on the top screening surface thereof.

4. The dewatering screen panel of claim 1 wherein the integral stabilizer portions are elongated members extending along the panel at substantially a right angle to the spaced slits in a pulsator portion bordering thereby.

5. The screen panel assembly of claim 1 wherein the pulsator portions are of generally rectangular configuration and are arranged in spaced side-by-side relationship along their major dimension.

6. The screen panel assembly of claim 1 wherein the diaphram elements are of generally rectangular configuration having a length to a width ratio of a least about 10:1.

7. The screen panel assembly of claim 1 wherein the frame member includes a supporting flange for supporting and fixedly mounting the stabilizer portions of the panel.

8. The dewatering screen panel of claim 1 wherein the panel securing means includes connecting members accurately located and anchored within the panel about the periphery thereof and tensioning members mounted on the frame and cooperating with the connecting members to hold the panel to its non-adjustable bidirectionally taut condition.

9. The screen panel assembly of claim 1 wherein the panel securing means includes an adhesive immovably holding the stabilizer portions in engagement with the frame.

10. The screen panel assembly of claim 1 wherein the spaced parallel slits in the elastomeric panel are knife thin and exhibit no removal of elastomeric material.

11. A dewatering process particularly well suited for use with slurries of fine particulate solids comprising the steps of providing a nonadjustable self-cleaning elastomeric screen deck having a substantially smooth and taut top surface bidirectionally and uniformly tensioned within the plane of the deck and a plurality of columned screening areas extending along the screen in a first direction, each area being rigidly secured in its tensioned condition and comprised of a plurality of flexible aligned, confronting diaphram elements defining elongated nonadjustable spaced slits extending fully through the deck and uninterruptedly traversing the screening area; vibrating said screen deck at a frequency and amplitude sufficient to effect limited pulsating motion of the diaphram elements fully within the plane of the nonadjustable screen deck independent of the vibrating motion of the screen deck and feeding a slurry of fine particulate solids to the vibrating screen deck for movement across said deck in said first direction whereby the pulsating motion of the pulsators effectively draws the fluid from the slurry as the solid particles therein are conveyed across the smooth and taut top surface of the screen deck.

12. The process of claim 11 wherein the screen deck is inclined.

13. The process of claim 11 wherein the screen deck is substantially horizontal.

14. The process of claim 11 wherein the screen deck is vibrated at low amplitude at frequencies up to 3,600 rpm.

15. The process of claim 11 wherein the slurry is fed to the screen deck in a direction substantially normal to the flexible diaphragm elements and elongated intermediate slits.

16. The process of claim 11 wherein the vibration effects rapid dewatering to form a coherent mass of solid particles without substantial fine particle loss.

17. The process of claim 11 wherein the slurry is excessively dilute so as to effect a selective separation of the particles by size.

* * * * *